(12) United States Patent
Branlard et al.

(10) Patent No.: US 7,972,705 B2
(45) Date of Patent: Jul. 5, 2011

(54) USE OF A CROSSLINKABLE SILICONE-BASED INVERSE EMULSION FOR PRODUCING "BREATHABLE WATERPROOF" COATINGS

(75) Inventors: Paul Branlard, Lyons (FR); Martial Deruelle, Mornant (FR); Yves Giraud, Sainte Foy Les Lyon (FR); Nadia Martin, Lyons (FR)

(73) Assignee: Rhodia Chimie, Aubervilliers (FR)

( * ) Notice: Subject to any disclaimer, the term of this patent is extended or adjusted under 35 U.S.C. 154(b) by 509 days.

(21) Appl. No.: 12/068,245

(22) Filed: Feb. 4, 2008

(65) Prior Publication Data

US 2008/0293876 A1     Nov. 27, 2008

Related U.S. Application Data

(63) Continuation of application No. 10/503,726, filed on Jan. 21, 2005, now abandoned, and a continuation of application No. PCT/FR03/00382, filed on Feb. 7, 2003.

(30) Foreign Application Priority Data

Feb. 8, 2002  (FR) ...................................... 02 01578

(51) Int. Cl.
*B32B 25/20*  (2006.01)

(52) U.S. Cl. .......................................... 428/447; 516/23

(58) Field of Classification Search .................. 428/447; 516/23

See application file for complete search history.

(56) References Cited

U.S. PATENT DOCUMENTS

| 3,076,726 A | 2/1963 | Ault et al. |
| 3,434,875 A | 3/1969 | Smith et al. |
| 4,625,010 A | 11/1986 | Huhn et al. |
| 5,789,025 A | 8/1998 | St. Clair |
| 6,479,057 B2 * | 11/2002 | Allwohn et al. .............. 424/401 |
| 6,511,754 B1 | 1/2003 | Bohin et al. |
| 6,902,816 B1 * | 6/2005 | Bertry et al. ................... 428/447 |

FOREIGN PATENT DOCUMENTS

| DE | 133197 | 12/1978 |
| EP | 0822219 B1 | 2/1998 |
| EP | 1088540 A1 | 4/2001 |
| FR | 2787803 A1 | 6/2000 |
| WO | 99 33434 | * 7/1999 |
| WO | 00 59992 | * 10/2000 |

* cited by examiner

*Primary Examiner* — Kuo-Liang Peng

(74) *Attorney, Agent, or Firm* — Buchanan Ingersoll & Rooney, P.C.

(57) ABSTRACT

Silicone coating on various soft supports, for instance textiles, made of synthetic polymers (polyamide, polyester) provides an efficient method for producing water impermeable and water permeable coatings, on soft supports, said method enabling to improve permeability to water vapor of the silicones while preserving impermeability to water. The inventive method enabling this consists mainly in: coating one of the surfaces of the support with a film formed by an invert water-in-oil silicone emulsion comprising a continuous oily silicone phase phi s, crosslinkable into elastomer and including a polyorganosiloxane (POS) A crosslinkable by addition polymerization, by cationic process or free-radical process; optionally a crosslinking organosilicon compound B; and optionally at least a catalyst C; an aqueous phase phi a; a stabilizing agent; and in ensuring crosslinking of the silicone phase phi s and elimination of water. The invention also concerns water impermeable and water vapor permeable soft polyamide or polyester substrates obtained by using an invert water-in-oil silicone emulsion.

14 Claims, 1 Drawing Sheet

USE OF A CROSSLINKABLE SILICONE-BASED INVERSE EMULSION FOR PRODUCING "BREATHABLE WATERPROOF" COATINGS

CROSS-REFERENCE TO PRIORITY APPLICATIONS

This application is a continuation of U.S. patent application Ser. No. 10/503,726, now abandoned, filed Jan. 21, 2005 and is a continuation/national phase of PCT/FR 03/00382, filed Feb. 7, 2003 and designating the United States (published in the French language on Aug. 14, 2003, as WO 03/066960 A1; the title and abstract were also published in English), which claims priority under 35 U.S.C. §119 of FR 0201578, filed Feb. 8, 2002, each hereby expressly incorporated by reference in its entirety and each assigned to the assignee hereof.

The invention relates to the general field of silicone coating on various pliable supports, for example textiles, made of synthetic polymers (polyamide, polyester, etc.).

More precisely, the invention relates to the coating of pliable (or flexible) materials with liquid compositions containing one or more polyorganosiloxanes (POS) that are crosslinkable by polyaddition, by polycondensation, by cationic means or by free-radical means, so as to form a protective film or coating having especially breathable waterproof (permeable to moisture vapour but impermeable to water) and/or hydrophobic properties.

The pliable supports, in particular textile supports, which can be coated with films made of crosslinked silicone elastomers are, for example, fabrics for clothing.

The web of pliable supports is coated on at least one of its faces with a silicone film which can be crosslinked, with the aid of means for activating the crosslinking arranged downstream of the coating head. These means for activating the crosslinking can be heat emitters, radiation (e.g. UV) emitters or electron beam emitters, inter alia.

In the clothing industry, technical fabrics industry or furniture industry, there exists a constant need for materials which do not allow water, but only moisture vapour, to pass through. Being protected against water, whether it comes from the outside, such as rainwater, or from the inside, such as moisture vapour from perspiration, destined for rapid condensation, is in fact a particularly important element of comfort for users. To avoid this coming into contact with water, the textile barrier should allow rapid evacuation of the endogenous water when it is in vapour form before it condenses, and should oppose the penetration of the exogenous water, even when said water is under (slight) pressure.

Besides its performance levels of impermeability to liquid water and of "breathability" with respect to moisture vapour, other properties are required for the pliable supports, in particular textiles, namely in particular: permeability to air, beading effect, etc.

In order to be able to be "breathable waterproof", a pliable support must be pierced with millions of quite small pores so as not to allow droplets of water to pass through but only to allow water in the form of vapour to pass through.

Two techniques are used to obtain this property: laminating and coating.

Laminating consists in laminating a porous very fine membrane onto the outer layer of the piece of clothing (2 layers) or between the outer layer and the lining (3 layers, for example GORE®).

Moreover, coating consists in passing a coating over the piece of clothing, on which microholes will allow moisture vapour to pass through. The coating film may, for example, be made of microporous polyurethane.

A certain number of patents exists which relate mainly to microporous "breathable waterproof" pliable supports (membranes), that are waterproof and permeable to moisture vapour, made of expanded polytetrafluoroethylene (for example U.S. Pat. No. 5,948,707; U.S. Pat. No. 4,187,390; U.S. Pat. No. 3,953,566; U.S. Pat. No. 4,194,041; WO-A-99/39038), or based on polyurethane (for example EP-A-0 503 826).

Silicones are used in these productions comprising microporous "breathable waterproof" membranes.

Firstly, the involvement of the silicones can be to form coatings which make the supports impermeable. This is illustrated by EP-A-0 503 826, which describes novel organosilicone compounds, neopentasiloxanes, $Si(OSiR^2Q)_4$ with Q consisting of ethylene oxide and/or propylene oxide units, and the use of these silicones in the formation of a film that is waterproof and permeable to moisture vapour. In fact, polyurethane membranes suffer from a low resistance to abrasion and a loss of waterproofness when the permeability to moisture vapour increases. According to EP-A-0 503 826, the use of these organosilicone compounds as co-ingredients in the polyurethane coatings makes it possible to increase the performance levels of the latter.

As described in WO-A-01/26495, silicones can also be used to impermeabilize seams.

According to U.S. Pat. No. 5,948,707 silicones can contribute to improving the mechanical properties of microporous "breathable waterproof" membranes. This patent relates more precisely to an expanded PTFE membrane in which one of the faces is covered with a discontinuous elastomeric coating which introduces non-slip properties by substantially increasing the friction coefficient.

WO-A-91/17205 discloses the use of crosslinkable or non-crosslinkable elastomeric silicones for producing interpenetrating matrices of PTFE resin and of silicone and thus improving the physical characteristics of the material. These structures are microporous, waterproof and permeable to moisture vapour, with improved physical characteristics and resistance to detergents. The silicone penetrates inside the pores, producing a coating of the nodes interconnected by fibrils and of the fibrils themselves.

It emerges from this review of the state of the art that it is unknown to use a silicone elastomer, and even less so a "water-in-silicone oil" emulsion, as essential constituent material of microporous pliable supports that are waterproof and permeable to moisture vapour.

Nevertheless, the known microporous "breathable waterproof" ready-made garments comprising silicone can still be improved as regards their waterproofness and their moisture vapour-permeability, while at the same time satisfying economic constraints.

Moreover, improvements are always desirable in economic terms and in terms of industrial operating conditions: ease of implementation/hygiene and safety.

Under these circumstances, an essential aim of the invention is to propose an effective process for producing coatings that are waterproof and permeable to moisture vapour, on pliable supports, this process allowing an improvement in the moisture vapour-permeability of silicones while at the same time conserving the waterproofness.

Another essential aim of the invention is to propose an economical, readily implemented and safe process for producing coatings that are waterproof and are permeable to moisture vapour, on pliable supports.

Another essential aim of the invention is to propose a novel silicone starting material for processes for producing coatings that are waterproof and permeable to moisture vapour, on pliable supports, this novel starting material having to be effective (waterproofness/moisture vapour-permeability) and economical, and easy and harmless to handle.

Another essential aim of the invention is to propose "waterproof breathable" silicone fabrics which are entirely effective and relatively expensive, and which can be manufactured under industrial conditions.

These aims, among others, are achieved by the present invention, which relates, first of all, to a process for producing coatings that are waterproof and permeable to moisture vapour, on pliable supports, characterized in that it consists essentially:

in applying to at least one of the faces of the support, so as to form a film, a silicone-based water-in-oil inverse emulsion comprising:
 a continuous oily silicone phase $\phi s$:
  which can be crosslinked into an elastomer
  and which comprises:
   -A- at least one polyorganosiloxane (POS) that is crosslinkable by polyaddition, by polycondensation, by cationic means or by free-radical means;
   -B- optionally at least one crosslinking organosilicic compound;
   -C- optionally at least one catalyst for the crosslinking reaction;
 an aqueous phase $\phi a$ comprising at least 20% by weight of water,
 at least one stabilizer,
in seeing to it that the silicone phase $\phi s$ crosslinks and that removal of water occurs.

This therefore involves using a reactive, film-forming water-in-silicone oil inverse emulsion to coat a pliable support, for example a microporous membrane, for the purpose of forming, after crosslinking, a silicone elastomer coating which is itself also microporous.

The inverse silicone-based emulsions consist of droplets of water in a continuous silicone oil phase. The water-in-oil emulsions according to the invention do not comprise the water-in-silicone oil emulsions obtained from silicone elastomers in solution in organic solvents.

They can be obtained by means of emulsification processes well known to those skilled in the art and which involve mixing an aqueous phase $\phi a$ and an oily phase $\phi s$ without or with milling, i.e. with high shear.

Without wishing to be bound to the theory, the principle of this invention would therefore be as follows: when coated onto the support to be treated, the inverse emulsion constitutes a film. The oily phase of the emulsion is then crosslinked so as to form the coating and the aqueous phase is eliminated by evaporation (either during the crosslinking or by heating). The disappearance of the water then results in the formation of micropores in the silicone film. It is therefore necessary to use a reactive silicone oil.

Furthermore, the elimination of the water contained in the emulsion gives the fabric the "breathability".

If the thickness of the coating is of the size of the particles, the evaporation of the water effectively creates pores, i.e. a direct contact between the outside and the inside of the fabric.

On the other hand, if the coating is thicker than the droplets of water, there will not, a priori, be this contact. However, it is then possible for percolation to occur and for "pathways" to be created during the evaporation and to thus allow the moisture vapour to pass through.

The silicone phase $\phi s$ preferably has a viscosity $\eta$ at 25° C. of less than 2000 mPa·s, preferably of between 100 and 1400 mPa·s, and even more preferably of between 100 and 800 mPa·s.

The aqueous phase $\phi a$ preferably comprises from 30 to 90% by weight of water, and even more preferably from 40 to 80% by weight of water.

As regards the mean particle size of the dispersed phase (water), it is chosen so as to confer a certain stability on the inverse emulsion. This mean particle size is not critical. It is preferable for this aqueous phase $\phi a$ to have a mean particle size defined by its mean diameter D50 (in μm) such that:

$$D50 \leqq 100$$

preferably $0.001 \leqq D50 \leqq 50$.

For the purpose of the invention, the parameter $D_{50}$ is the median size of the granulometric distribution. It can be determined on the graph of cumulative granulometric distribution, obtained by one of the analytical techniques mentioned below, by determining the size corresponding to the cumulation of 50% of the population of the particles. In practical terms, this granulometric parameter $D_{50}$ corresponds to the mean maximum size of at least 50% of the mass of particles under consideration; a $D_{50}$ of 10 μm indicates that 50% of the particles are less than 10 μm in size. The granulometric measurements can be carried out by conventional techniques such as sedimentation, laser diffraction (for example COULTER® LSI30: with the proviso of using a cuvette suitable for this measurement), optical microscopy coupled to image analysis, etc.

The stabilizer is preferably chosen from the group comprising:
 non-ionic, anionic, cationic, or even zwitterionic surfactants;
 silicone polyethers;
 solid particles, preferably particles of silica optionally in combination with at least one co-stabilizer, preferably selected from non-anionic, anionic, cationic, or even zwitterionic surfactants;
 and mixtures thereof;
 solid particles optionally in combination with at least one co-stabilizer being particularly preferred.

The surfactants are chosen more generally as a function of the HLB. The term "HLB" (hydrophilic lipophilic balance) denotes the ratio of the hydrophilicity of the polar groups of the surfactant molecules to the hydrophobicity of their lipophilic portion. HLB values are in particular reported in various basic manuals such as the "Handbook of pharmaceutical excipients, The Pharmaceutical Press, London, 1994".

The water/silicone emulsions can also be stabilized via silicone polyethers (Silicone surfactants—Surfactant Science series V86 Ed Randal M. Hill (1999)).

Moreover, since the beginning of the century, solid particles are known to enable the stabilization of water-in-oil emulsions. The formation of a water-in-oil emulsion is promoted when the angle of contact between the oil, the solid and the water is greater than 0° C. The addition of a co-stabilizer can make it possible to improve the stability of emulsions. [Journal of colloid and interface science 213, 352-359 (1999)].

As regards the make-up of the continuous oily silicone phase $\phi s$, it may, according to a first embodiment, be a composition of the type such as that which is crosslinkable by cationic means, in the presence of a photoinitiator and with actinic activation. More precisely, such a composition may comprise:

-A- at least one POS carrying crosslinking functional groups, the latter being preferably chosen from groups comprising at least one ethylenically unsaturated function—advantageously acrylate and/or alkenyl ether—and/or epoxide and/or oxethane, -B- optionally at least one silane and/or one POS carrying functional groups which may or may not be of the same nature as the crosslinking functional groups of POS A, -C- at least one photoinitiator system, preferably chosen from the onium salts of an element of groups 15 to 17 of the Periodic Table or of an organometallic complex of an element of groups 4 to 10 of the Periodic Table, the crosslinking functional groups being preferably chosen from groups comprising at least one ethylenically unsaturated function—advantageously acrylate and/or alkenyl ether—and/or epoxide and/or oxethane.

Even more preferably, the POSs A are epoxysilicones and/or vinyl ether silicones which are:
either linear or substantially linear and consist of units of formula (II.1) ending with units of formula (II.2),
or cyclic and consist of units of formula (II.1):

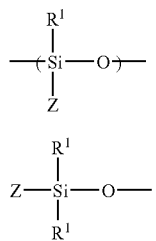
(II.1)

(II.2)

in which formulae:
the symbols $R^1$ are similar or different and represent:
either a linear or branched $C_1$-$C_6$ alkyl radical optionally substituted advantageously with one or more halogens, the preferred optionally substituted alkyl radicals being: methyl, ethyl, propyl, octyl and 3,3,3-trifluoropropyl,
or an optionally substituted $C_5$-$C_8$ cycloalkyl radical,
or an aryl or aralkyl radical optionally substituted:
in particular with halogens and/or alkoxyls,
the phenyl, xylyl, tolyl and dichlorophenyl radicals being particularly selected,
and, even more preferably, at least 60 mol % of the radicals $R^3$ being methyls,
the symbols Z are similar or different and represent:
either the radical $R^1$,
or a crosslinking functional group corresponding to an epoxide or vinyl ether residue linked to the silicon by means of a divalent radical advantageously containing from 2 to 20 carbon atoms optionally comprising a hetero atom, at least one of the symbols Z corresponding to a crosslinking functional group;

the POSs A most specially envisaged in the context of the invention are epoxysilicones of formulae (A.I) and (A.II) below:

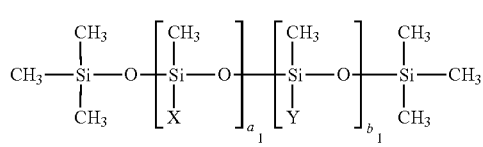
(A.I)

with
X=$CH_3$; phenyl; cycloalkyl; alkyl; $C_1$-$C_{18}$ alkyl; alkenyl; —OH; H; $CH_2$—$CH_2$—$CH_2$—OH; $CH_2$—$CH_2$—$CF_3$; —$(CH_2)$—$CF_3$, n=1 to 20;

and Y=

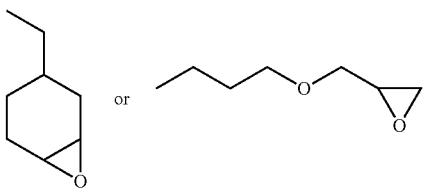

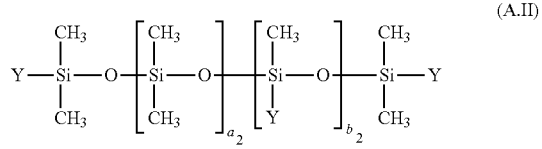
(A.II)

$a_1$, $a_2$ and $b_1$, $b_2$ being defined as follows, in these formulae (A.I) and (A.II)

| | | |
|---|---|---|
| | $1 \leq a_1, a_2$ | $1 \leq b_1, b_2$ |
| preferably | $1 \leq a_1, a_2 \leq 5000$ | $1 \leq b_1, b_2 \leq 500$ |
| and even more preferably | $1 \leq a_1, a_2 \leq 1000$ | $1 \leq b_1, b_2 \leq 100$; |

$a_2$, $b_2$ being=0 in formula (A.II) to give the epoxidized disiloxane (A.III).

According to a preferred characteristic of the invention, the initiators C are, for example: triarylsulphonium salts (for example: [aryl]$_3$S$^+$, PF$_6$ such as that sold by the company Ciba Geigy under the name Cyracure® PI UV 6990), or else the onium borates described in European patent application No. 0 562 922, the entire content of which is included in the present application by way of reference. Even more precisely, it is possible, in practice, to use the initiator having the formula below:

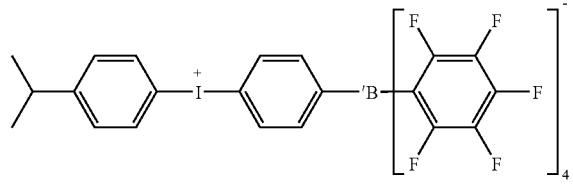

In practice, the initiators for the use according to the invention are prepared very simply by dissolving onium borate or an organometallic complex, preferably of onium, in the form of a solid (powder), in a solvent.

According to an alternative with regard to the onium borate, the latter can be prepared directly in the solvent, from a salt (e.g. chloride) of the cation (iodonium) and a salt (for example potassium salt) of the borate anion.

Preferably, it is envisaged in accordance with the use according to the invention that the initiator (PI) will be used in solution in an organic solvent, preferably chosen from solvents which are proton donors, and even more preferably from the following group: isopropyl alcohol, benzyl alcohol, diacetone alcohol, butyl lactate, esters, and mixtures thereof. As is claimed in French patent No. 2 724 660, organic solvents which are proton donors and which are aromatic in nature (benzyl alcohol), behave as crosslinking accelerators. It is therefore advantageous to use them to dissolve the photoinitiator.

It should be specified that the expression "effective catalytic amount of PI" is intended to mean, for the purpose of the invention, the amount that is sufficient to initiate the crosslinking.

In so far as, in practice—as indicated above—, the photoinitiator is advantageously dissolved in a polar solvent, it is in an amount such that its titre in the solution obtained is between 1 and 50% by weight, preferably between 10 and 30% by weight, and even more preferably between 15 and 25% by weight.

According to an advantageous feature of the use according to the invention, the incorporation of the PI in solution into the oily silicone phase φs is carried out at a rate of 0.1 to 10% by weight of solution relative to the final mixture, preferably 0.5 to 5% by weight, and more preferably of the order of 1% by weight.

In practice, the photoinitiator is thus often present in this oily silicone phase φs before the emulsification. This photoinitiator can optionally play the role of co-surfactant.

In accordance with a second embodiment corresponding to a mode of crosslinking of the silicones by polyaddition, the following products are chosen as constituents of the silicone phase:

POS (A'): product having units of formula:

$$W_a Z_b SiO_{\frac{4-(a+b)}{2}} \quad (A'.1)$$

in which:
W is an alkenyl group, preferably vinyl or alkyl,
Z is a monovalent hydrocarbon-based group, free of unfavourable action on the activity of the catalyst and preferably chosen from alkyl groups containing from 1 to 8 carbon atoms inclusive, advantageously from the groups methyl, ethyl, propyl and 3,3,3-trifluoropropyl, and also from aryl groups and, advantageously, from the xylyl, tolyl and phenyl radicals,
a is 1 or 2, b is 0, 1 or 2 and a+b is between 1 and 3, optionally at least some of the other units are units of general formula:

$$Z_c SiO_{\frac{4-c}{2}} \quad (A'.2)$$

in which Z has the same meaning as above and c has a value of between 0 and 3, for example between 1 and 3; dimethylpolysiloxanes with dimethylvinylsilyl ends, copolymers of methylvinyldimethylpolysiloxanes with trimethylsilyl ends, copolymers of methylvinyldimethylpolysiloxanes with dimethylvinylsilyl ends and cyclic methylvinylpolysiloxanes being more specially selected;

POS (B'): product having siloxyl units of formula:

$$H_d L_c SiO_{\frac{4-(d+c)}{2}} \quad (B'.1)$$

in which:
L is a monovalent hydrocarbon-based group free of unfavourable action on the activity of the catalyst and preferably chosen from alkyl groups containing from 1 to 8 carbon atoms inclusive and, advantageously, from the groups methyl, ethyl, propyl and 3,3,3-trifluoropropyl, and also from aryl groups and, advantageously, from the xylyl, tolyl and phenyl radicals, d is 1 or 2, c is 0, 1 or 2, d+c has a value of between 1 and 3,
optionally at least some of the other units being units of general formula:

$$L_g SiO_{\frac{4-g}{2}} \quad (B'.2)$$

in which L has the same meaning as above and g has a value of between 0 and 3, and (methylhydrosiloxy) (α,ω-dimethylhydro)-poly(dimethylsiloxane) being more specially selected.

These POSs that are crosslinkable by polyaddition can be of the type such as those which crosslink at room temperature or under hot conditions by means of polyaddition reactions in the presence of a metal catalyst, in this case platinum-based. They are crosslinkable POS compositions referred to as RTV ("room temperature vulcanizing") or cold vulcanizable elastomers (EVF).

However, it may be desirable, on an industrial level, to accelerate the crosslinking by increasing the temperature of the silicone layer deposited onto the pliable support (for example 100-150° C.)/tunnel oven in an industrial device functioning continuously. This involves the polyaddition POS compositions referred to as HVE, which is the abbreviation for "hot vulcanizable elastomer".

The two-component or single-component POS compositions that are RTV or HVE by means of polyaddition, essentially by reaction of hydrosylyl groups on sylylated alkenyl groups, generally in the presence of a metal catalyst (preferably a platinum catalyst), are described, for example, in U.S. Pat. Nos. 3,220,972, 3,284,406, 3,436,366, 3,697,473 and 4,340,709.

According to a third embodiment, the silicone phase can crosslink by polycondensation of OH groups and/or of hydrolysable groups, in the presence of a tin catalyst. This is aimed at two-component or single-component POS compositions which crosslink at room temperature by means of polycondensation reactions under the action of moisture, generally in the presence of a metal catalyst, for example a tin compound (RTV polycondensation).

The POSs which go into making up these RTV polycondensation compositions are linear, branched or crosslinked polysiloxanes carrying hydroxyl groups or hydrolysable groups, for example alkoxy. Such compositions can also contain a crosslinking agent, which is, in particular, a cylinder carrying at least 3 hydrolysable groups, such as, for example, a silicate, an alkyltrialkoxysilane or an aminoalkyltrialkoxysilane.

These compositions are described, for example, in U.S. Pat. Nos. 3,065,194, 3,542,901, 3,779,986 and 4,417,042 and in patent FR-2 638 752 (single-component compositions) and in U.S. Pat. Nos. 3,678,002, 3,888,815, 3,933,729 and 4,064, 096 (two-component compositions).

Besides these POSs, the liquid silicone coating composition can also contain:
-D- at least one adhesion promoter (D);
-E- and/or at least one additive (E) that is common in silicone compositions which crosslink by cationic means or by free-radical means, by polyaddition or by polycondensation.

As regards the additives (E), mention may be made of:
for the POSs that are crosslinkable by cationic and/or free-radical means or by activation with radiation or electron beams:
epoxy ether diluents,
pigments of the type carbon black, titanium dioxide, phthalocyanin, benzimidazolone, naphthols (BONA pigment lakes); diazopyrazolones; diarylide or monoarylide yellow pigments and the like, benzimidazolone, naphthone, diazopyrazolone, and the like, photosensitizers chosen from poly(aromatic) products—optionally metallic—and heterocyclic products (phenothiazine, tetracene, perylene, anthracene, xanthopinacol, thioxantone, and the like), inhibitors of crosslinking, preferably chosen from alkaline products, and even more preferably from alkaline products of the amino type, for example of the type such as those consisting of a silicone onto which is grafted at least one amine group, preferably tertiary amine group;

for the polyaddition RTV POS compositions:

agents which slow the addition reaction (e.g. tetramethylvinyltetrasiloxane, pyridine, phosphines, phosphites, unsaturated amides and acetylenic alcohols;

for the polycondensation RTV or HVE POS compositions:

crosslinking agents such as alkyltrialkoxysilanes, alkyl silicates, poly(alkyl silicates) (methyl silicate, ethyl silicate, isopropyl silicate, n-propyl silicate, and the like);

and, in general, for all the POSs:

pigments,

α-olefins, the fillers, and in particular the silicon fillers, may, for example, be pyrogenic silicas treated with hexamethyldisilazanes or with octamethylcyclotetra-siloxanes (specific surface area 300 m$^2$/g), silica fume.

These fillers may or may not be inorganic, e.g.: ground synthetic or natural fibre (polymers), calcium carbonate, talc, clay, titanium dioxide, and the like.

As regards the methodological characteristics, an amount of inverse silicone emulsion such that the thickness of the film forming the coating is less than or equal to 500 µm, preferably between 150 and 300 µm, is applied to the support.

According to another of its aspects, the invention relates to the use of a water-in-oil inverse silicone emulsion, comprising:

a continuous oily silicone phase φs:

which can be crosslinked into an elastomer and which comprises:

-A- at least one polyorganosiloxane (POS) that is crosslinkable by polyaddition, by polycondensation, by cationic means or by free-radical means;

-B- optionally at least one crosslinking organo-silicic compound;

-C- optionally at least one catalyst for the cross-linking reaction;

an aqueous phase φa, at least one stabilizer, for producing coatings that are waterproof and permeable to moisture vapour, on pliable supports.

Also protected by the invention is any film-forming water-in-oil inverse silicone emulsion, for producing coatings that are waterproof and permeable to moisture vapour, on pliable supports, characterized in that it comprises:

a continuous oily silicone phase φs:

which can be crosslinked into an elastomer and which comprises:

-A- at least one polyorganosiloxane (POS) that is crosslinkable by polyaddition, by polycondensation, by cationic means or by free-radical means;

-B- optionally at least one crosslinking organo-silicic compound;

-C- optionally at least one catalyst for the cross-linking reaction;

an aqueous phase φa comprising at least 20% by weight of water, at least one stabilizer, at least one additive which promotes adhesion of the coating to the support and/or an improvement in the waterproof and moisture vapour-permeability properties, and/or at least one additive for optimizing the mechanical properties of the coating. The water-in-oil emulsions according to the invention do not comprise the water-in-silicone oil emulsions obtained from silicone elastomers in solution in organic solvents.

Finally, another subject of the invention consists of a pliable support, preferably textile support, and even more preferably synthetic textile support, characterized in that it is coated on at least one of its faces with a coating that is waterproof and permeable to moisture vapour, obtained by implementing the process as defined above or according to the use as defined above, or else using the emulsion as defined above.

BRIEF DESCRIPTION OF THE DRAWINGS

The attached

EXAMPLES

Figure 1:
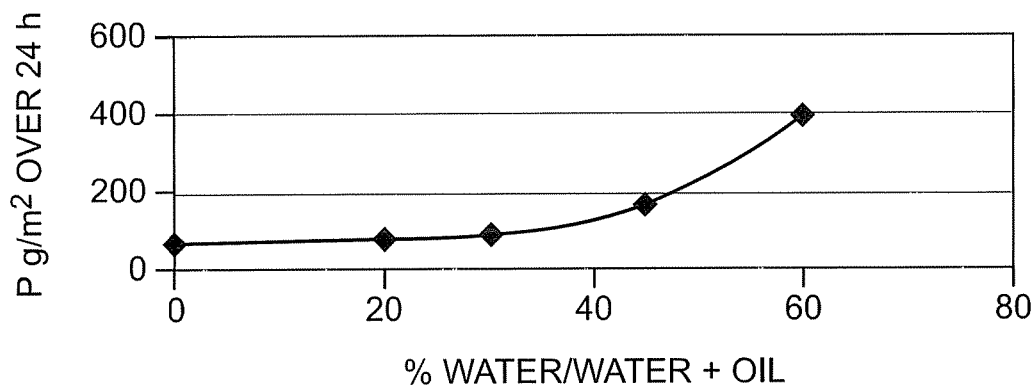
FIGS. 1 and 2 are graphs giving the permeability P in g/m$^2$ over 24 hours of a fabric coated with the water-in-oil inverse emulsion, as a function of the water content in % of the emulsion.

The support used in these experiments is made of polyamide (110 decitex).

The coating methods are well known to those skilled in the art.

Examples 1 and 2

Advantage of the coating based on the silicone oil inverse emulsion compared to the coating with silicone oil alone.

TABLE 1

| Example | Coating type | Nature of the oil | % oil | % water | Nature of the stabilization |
|---|---|---|---|---|---|
| 1 | Oil | A.I with $a_1$ = 70-80 $b_1$ = 7-8 and η = 350 mPa · s | 100 | 0 | — |
| 2 | Inverse emulsion | A.I with $a_1$ = 70-80 $b_1$ = 7-8 and η = 350 mPa · s | 60 | 40 | Silica |

On a laboratory scale, the oil is introduced into an IKA-type reactor equipped with a scraper blade and a counter blade. The silica is introduced into the oil with stirring (80-100 rpm). After complete dispersion of the silica in the oil, the water is introduced slowly and the stirring is maintained until the water has been completely incorporated. When the stirring is stopped, no drop of water should be visible at the surface.

The stabilization is provided by a hydrophobic precipitated silica (for example Sipernat® D10 from Degussa).

The photoinitiator is present in the oil before the emulsification, at a rate of 0.5% by weight, and combines 0.5% by weight of a cosolvent consisting of isopropanol. The photoinitiator used is that having the formula below:

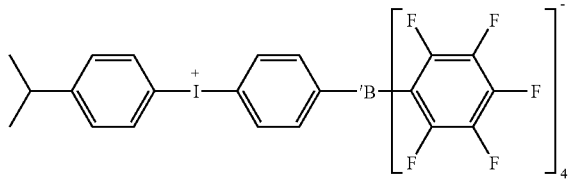

Evaluation of the Permeability:

In an MPC oven or air-conditioned room at 25° C. and 50% relative humidity, the coated support is placed in a leaktight manner over an aluminium crucible containing 150 ml of water, a drop of bactericide and a piece of sponge which makes it possible to avoid any contact between the membrane and the water. The crucible should be placed in the air-conditioned room or the oven for 48 h before measurements start to be taken. After equilibration, the crucible is weighed regularly every 24 hours.

The curve of the loss in mass as a function of time is plotted. This curve should be taken into account when it becomes linear. The permeability P can then be calculated in the following way:

$P = \text{slope}/\pi r^2$ expressed in g/m²/24 h with:
slope in g/24 h
$r = 0.05$ m: radius of the surface of exchange through the membrane
The results obtained are as follows:

TABLE 2

| Example | Description | Permeability g/m² over 24 h |
|---|---|---|
| 1 | Support + A.I with $a_1 = 70$-$80$, $b_1 = 7$-$8$ and $\eta = 350$ mPa·s | 63 |
| 2 | Support + A.I inverse emulsion with $a_1 = 70$-$80$, $b_1 = 7$-$8$ and $\eta = 350$ mPa·s | 402 |

The inverse emulsion of crosslinkable silicone oil makes it possible to multiply by 6.4 the permeability to moisture vapour of a silicone oil.

Examples 3 to 7

Influence of the water content of the inverse emulsion:

In addition, this test was carried out in order to compare the permeability provided by emulsions containing various amounts of water: 20%, 30%, 45% and 60%. The emulsions are stabilized with 8% silica relative to the water.

The permeabilities thus obtained are as follows:

TABLE 3

|  | Example | | | | |
|---|---|---|---|---|---|
|  | 3 | 4 | 5 | 6 | 7 |
| % water/water + oil | 0 | 20 | 30 | 45 | 60 |
| P g/m² over 24 h | 63 | 72 | 79 | 165 | 402 |

It is therefore noted that, the greater the amount of water in the emulsion, the greater the permeability to moisture vapour (see attached FIG. 1).

Examples 8 to 10

The permeability to moisture vapour was also evaluated at 38° C. and 50% RH.
The inverse emulsions used for the coating contain from 20 to 60% of water.
The results are as follows:

TABLE 4

|  | Example | | |
|---|---|---|---|
|  | 8 | 9 | 10 |
| % water/water + oil | 20 | 40 | 60 |
| P g/m² over 24 h | 195 | 699 | 2292 |

Figure 2:
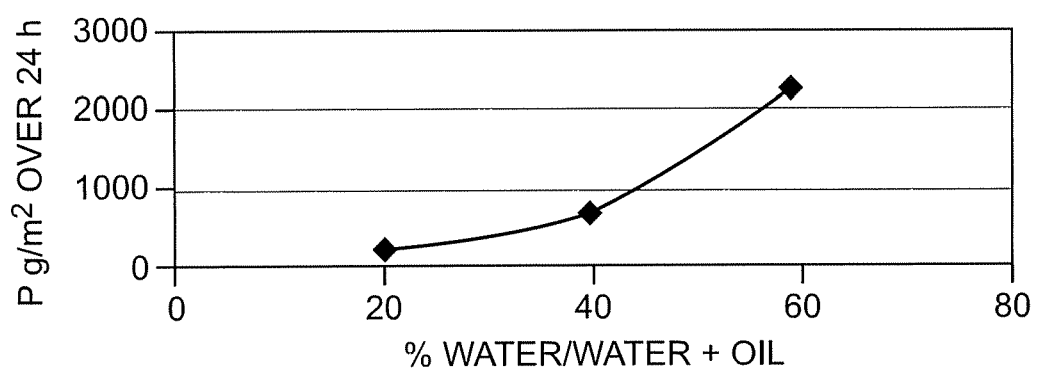

These results are reported in the attached FIG. 2.

Given that, in the absence of coating, the support alone results in a permeability of 3076 g/m² over 24 h, the inverse emulsion containing 60% of water therefore makes it possible to recover 75% of the permeability of the support.

Examples 11 to 14

The permeability to moisture vapour (23° C., 50% RH) was also tested on clothing fabrics containing cotton and polyester using an inverse emulsion containing 60% of water stabilized with 8% of silica/water.

Overall, the results were as follows:

TABLE 5

| Examples | Support type | Permeability support alone (1) | Permeability support + inverse emulsion (2) | Ratio (1)/(2) |
|---|---|---|---|---|
| 11 | Polyester | 1769 | 705 | 40% |
| 12 | Polyamide | 2026 | 810 | 40% |
| 13 | Polyester-cotton 67/33 | 1120 | 834 | 74% |
| 14 | Cotton | 1497 | 1000 | 67% |

Depending on the textile support used for the coating, it is possible to recover up to 74% of its permeability using an inverse emulsion.

All these results show that:
the use of an inverse emulsion of reactive silicone oil makes it possible to increase the permeability to moisture vapour of the oil,
to obtain waterproof breathable coatings,
the permeability increases with the water content of the inverse emulsion.

The invention claimed is:
1. A process for producing coatings that are waterproof and permeable to moisture vapor, on textile supports, comprising:
applying to at least one of the faces of the support, so as to form a film, a silicone-based water-in-oil inverse emulsion comprising:
(A) a continuous oily silicone phase φs, which can be crosslinked into an elastomer and which comprises:
at least one polyorganosiloxane (POS) that is crosslinkable by polyaddition, by polycondensation, by cationic means or by free-radical means; the at least one

POS having crosslinking functional groups, wherein the crosslinking functional groups are groups having at least one ethylenically unsaturated function and/or epoxide and/or oxethane;
optionally at least one silane and/or one POS carrying functional groups which may or may not have the crosslinking functional groups of POS;
at least one photoinitiator system selected from the onium salts of an element of groups 15 to 17 of the Periodic Table or of an organometallic complex of an element of groups 4 to 10 of the Periodic Table,
optionally at least one catalyst for the crosslinking reaction;
(B) an aqueous phase φa comprising at least 20% by weight of water,
(C) at least one stabilizer,
wherein the ratio of the amount of water to the amount of water plus silicone is at least 20% by weight, and
crosslinking the silicone phase φs and
removing the water.

2. The process as defined by claim 1, wherein the silicone phase φs has a viscosity η at 25° C. of less than 2,000 mPa·s.

3. The process as defined by claim 1, wherein the aqueous phase φa comprises from 30 to 90% by weight of water.

4. The process as defined by claim 1, wherein the aqueous phase φa has a mean particle size defined by its mean diameter D50 (in μm) such that:

$$D50 < 100$$

5. The process as defined by claim 1, wherein the amount of inverse silicone emulsion applied to the support is such that the thickness of the film forming the coating is less than or equal to 500 μm.

6. The process as defined by claim 1, wherein the stabilizer is selected from the group consisting of:
non-ionic, anionic, cationic, and zwitterionic surfactants;
silicone polyethers;
solid particles;
and mixtures thereof;
the solid particles optionally in combination with at least one co-stabilizer.

7. The process as defined by claim 1, wherein the POSs are silicones having epoxy or vinyl ether functional groups and which are:
either linear or substantially linear and consist of units of formula (II.1), ending with units of formula (II.2),
or cyclic and consists of units of formula (II.1):

$$\begin{array}{c} R^1 \\ | \\ -(Si-O)- \\ | \\ Z \end{array} \quad (II.1)$$

$$\begin{array}{c} R^1 \\ | \\ Z-Si-O- \\ | \\ R^1 \end{array} \quad (II.2)$$

in which formulae:
the symbols $R^1$ are similar or different and represent:
either a linear or branched $C_1$-$C_6$ alkyl radical optionally substituted advantageously with one or more halogens,
or an optionally substituted $C_5$-$C_8$ cycloalkyl radical,
or an aryl or aralkyl radical optionally substituted:
with halogens and/or alkoxyls,
the phenyl, xylyl, tolyl or dichlorophenyl radicals,
the symbols Z are similar or different and represent:
either the radical $R^1$,
or a crosslinking functional group corresponding to an epoxide or vinyl ether residue linked to the silicon by means of a divalent radical comprising from 2 to 20 carbon atoms optionally comprising a hetero atom, at least one of the symbols Z corresponding to a crosslinking functional group.

8. The process as defined by claim 7, wherein the POSs is an epoxysilicone of formulae (A.I) or (A.II):

(A.I)

$$CH_3-\underset{\underset{CH_3}{|}}{\overset{\overset{CH_3}{|}}{Si}}-O-\left[\underset{\underset{X}{|}}{\overset{\overset{CH_3}{|}}{Si}}-O\right]_{a_1}-\left[\underset{\underset{Y}{|}}{\overset{\overset{CH_3}{|}}{Si}}-O\right]_{b_1}-\underset{\underset{CH_3}{|}}{\overset{\overset{CH_3}{|}}{Si}}-CH_3$$

(A.II)

$$Y-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_{a_2}-\left[\underset{\underset{Y}{|}}{\overset{\overset{CH_3}{|}}{Si}}-O\right]_{b_2}-\underset{\underset{CH_3}{|}}{\overset{\overset{CH_3}{|}}{Si}}-Y$$

in which:
X=$CH_3$; phenyl; cycloalkyl; alkyl; $C_1$-$C_{18}$ alkyl; alkenyl; —OH; H; $CH_2$—$CH_2$—$CH_2$—OH; $CH_2$—$CH_2$—$CF_3$; —$(CH_2)_n$—$CF_3$, n=1 to 20;
and Y=

[cyclohexyl epoxide structure] or [glycidyl ether structure]

$a_1$, $a_2$ and $b_1$, $b_2$ being defined as follows, in these formulae (A.I) and (A.II)

$$1 < a_1, a_2 \quad 1 < b_1, b_2.$$

9. A textile support, which is coated on at least one of its faces with a coating that is waterproof and permeable to moisture vapor, obtained by implementing the process according claim 1.

10. A process for producing coatings that are waterproof and permeable to moisture vapor, on textile supports, comprising:
applying to at least one of the faces of the support, so as to form a film, a silicone-based water-in-oil inverse emulsion comprising:
(A) a continuous oily silicone phase φs, which can be crosslinked into an elastomer and which comprises:
at least one polyorganosiloxane (POS) that is crosslinkable by polyaddition, by polycondensation, by cationic means or by free-radical means; wherein the following products are selected as constituents of the silicone phase:
POS (A'): product having units of formula:

$$W_a Z_b SiO_{\frac{4-(a+b)}{2}} \quad (A'.1)$$

in which:
W is an alkenyl group,
Z is a monovalent hydrocarbon-based group, free of unfavorable action on the activity of the catalyst and selected from alkyl groups containing from 1 to 8 carbon atoms inclusive, and also from aryl groups,
a is 1 or 2, b is 0, 1 or 2 and a+b is between 1 and 3, optionally at least some of the other units are units of general formula:

 (A'.2)

in which Z has the same meaning as above and c has a value of between 0 and 3,
POS (B'): product having siloxyl units of formula:

 (B'.1)

in which:
L is a monovalent hydrocarbon-based group free of unfavorable action on the activity of the catalyst and selected from alkyl groups comprising from 1 to 8 carbon atoms inclusive and
d is 1 or 2, c is 0, 1 or 2, d+c has a value of between 1 and 3,
optionally at least some of the other units being units of general formula:

 (B'.2)

in which L has the same meaning as above and g has a value of between 0 and 3;
optionally at least one crosslinking organosilicic compound;
optionally at least one catalyst for the crosslinking reaction;
(B) an aqueous phase φa comprising at least 20% by weight of water,
(C) at least one stabilizer,
wherein the ratio of the amount of water to the amount of water plus silicone is at least 20% by weight, and
crosslinking the silicone phase φs and
removing the water.

11. The process as defined by claim 10, wherein POS (A') is selected from the group consisting of dimethylpolysiloxanes with dimethylvinylsilyl ends, copolymers of methylvinyldimethylpolysiloxanes with trimethylsilyl ends, copolymers of methylvinyldimethylpolysiloxanes with dimethylvinylsilyl ends and cyclic methylvinylpolysiloxanes.

12. The process as defined by claim 10, wherein POS (B') is (methylhydrosiloxy) (α,ω-dimethylhydro)-poly(dimethylsiloxane).

13. Film-forming water-in-oil inverse silicone emulsion, for producing coatings that are waterproof and permeable to moisture vapor, on textile supports, which comprises:
a continuous oily silicone phase φs:
which can be crosslinked into an elastomer
and which comprises:
-A- at least one polyorganosiloxane (POS) that is crosslinkable by polyaddition, by polycondensation, by cationic means or by free-radical means; the at least one POS having crosslinking functional groups, wherein the crosslinking functional groups are groups having at least one ethylenically unsaturated function and/or epoxide and/or oxethane;
at least one photoinitiator system selected from the onium salts of an element of groups 15 to 17 of the Periodic Table or of an organometallic complex of an element of groups 4 to 10 of the Periodic Table,
optionally at least one silane and/or one POS carrying functional groups which may or may not have the crosslinking functional groups of POS; and
-B- optionally at least one crosslinking organosilicic compound;
-C- optionally at least one catalyst for the crosslinking reaction; an aqueous phase φa comprising at least 20% by weight of water,
at least one stabilizer,
at least one additive which promotes adhesion of the coating to the support and/or an improvement in the waterproof and moisture vapor-permeability properties,
and/or at least one additive for optimizing the mechanical properties of the coating.

14. A film-forming water-in-oil inverse silicone emulsion, for producing coatings that are waterproof and permeable to moisture vapor, on textile supports, which comprises:
a continuous oily silicone phase φs:
which can be crosslinked into an elastomer
and which comprises:
-A- at least one polyorganosiloxane (POS) that is crosslinkable by polyaddition, by polycondensation, by cationic means or by free-radical means; wherein the following products are selected as constituents of the silicone phase:
POS (A'): product having units of formula:

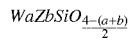 (A'.1)

in which:
W is an alkenyl group,
Z is a monovalent hydrocarbon-based group, free of unfavorable action on the activity of the catalyst and selected from alkyl groups containing from 1 to 8 carbon atoms inclusive, and also from aryl groups,
a is 1 or 2, b is 0, 1 or 2 and a+b is between 1 and 3, optionally at least some of the other units are units of general formula:

 (A'.2)

in which Z has the same meaning as above and c has a value of between 0 and 3,
POS (B'): product having siloxyl units of formula:

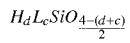 (B'.1)

in which:
L is a monovalent hydrocarbon-based group free of unfavorable action on the activity of the catalyst and selected from alkyl groups comprising from 1 to 8 carbon atoms inclusive and d is 1 or 2, c is 0, 1 or 2, d+c has a value of between 1 and 3,
optionally at least some of the other units being units of general formula:

 (B'.2)

in which L has the same meaning as above and g has a value of between 0 and 3;
- -B- optionally at least one crosslinking organosilicic compound;
- -C- optionally at least one catalyst for the crosslinking reaction;

an aqueous phase φa comprising at least 20% by weight of water, at least one stabilizer, at least one additive which promotes adhesion of the coating to the support and/or an improvement in the waterproof and moisture vapor-permeability properties, and/or at least one additive for optimizing the mechanical properties of the coating.

* * * * *